2,915,479
RACEMIZATION CATALYSTS AND PREPARATION

Charles William Den Hollander, Midland Park, N.J., assignor to Hoffmann-La Roche Inc., Nutley, N.J., a corporation of New Jersey No Drawing. Original application January 16, 1956, Serial No. 559,135, now Patent No. 2,819,272, dated January 7, 1958. Divided and this application June 6, 1957, Serial No. 663,902

5 Claims. (Cl. 252—473)

This invention relates to novel chemical processes, to novel catalysts useful in said processes, and to novel methods of preparing said catalysts. More particularly, the invention relates to novel processes of effecting at least the partial racemization of certain optically active octahydroisoquinoline derivatives, and to specific catalysts useful in effecting such racemizations.

This application is a division of my prior copending application Serial No. 559,135, which issued on January 7, 1958 as Patent No. 2,819,272.

The octahydroisoquinoline derivatives with which the invention is concerned, and which are employed as starting materials in the racemization processes referred to, are defined as optically active materials having the formula

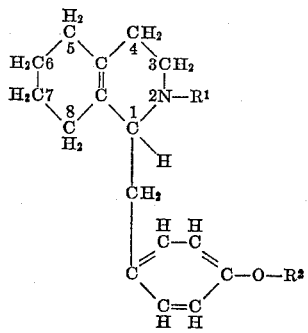

wherein $R^1$ is selected from the group consisting of hydrogen and hydrocarbon radicals having not more than 8 carbon atoms and $R^2$ is selected from the group consisting of hydrogen and lower alkyl radicals. Illustrative meanings of $R^1$ include hydrogen; lower alkyl radicals, such as methyl, ethyl and propyl; lower alkenyl radicals, such as allyl; lower alkinyl radicals, such as propargyl; aralkyl radicals, such as phenethyl; and the like. Illustrative meanings of $R^2$ include hydrogen, methyl, ethyl and the like. Exemplary of the materials which can be subjected to the processes of the invention are the optically active, enantiomorphic forms of 1-(p-methoxybenzyl) - 2-methyl-1,2,3,4,5,6,7,8-octahydroisoquinoline, 1 - (p-methoxybenzyl)-1,2,3,4,5,6,7,8-octahydroisoquinoline, 1 - (p-hydroxybenzyl)-2-methyl-1,2,3,4,5,6,7,8-octahydroisoquinoline, 1 - (p-hydroxybenzyl)-1,2,3,4,5,6,7,8-octahydroisoquinoline, 1-(p-hydroxybenzyl)-2-allyl-1,2,3,4,5,6,7,8 - octahydroisoquinoline, 1-(p-methoxybenzyl)-2-propargyl - 1,2,3,4,5,6,7,8 - octahydroisoquinoline, 1-(p-hydroxybenzyl) - 2 - propyl-1,2,3,4,5,6,7,8-octahydroisoquinoline, 1 - (p-hydroxybenzyl)-2-phenethyl-1,2,3,4,5,6, 7,8 - octahydroisoquinoline, 1 - (p-methoxybenzyl)-2-allyl-1,2,3,4,5,6,7,8-octahydroisoquinoline; and the like. A preferred class of materials for processing according to the invention are optically active materials represented by the above formula wherein $R^1$ represents hydrogen, methyl or allyl and $R^2$ represents hydrogen or methyl.

It has been found that effective catalysts for use in the racemization processes of the invention can be prepared by a process which comprises subjecting an aqueous solution containing palladous ions, zinc ions and iron ions, in the proportion of from about 2 to about 9 gram atoms of Pd: about 1 gram atom of Zn: about 1 gram atom of Fe, to the action of an alkaline material and a reducing agent. Whereas the relative proportions of the metals can be varied widely within the limits indicated, it is preferred to employ a solution containing palladous, zinc and iron ions in the proportion of about 4 gram atoms of palladium: about 1 gram atom of zinc: about 1 gram atom of iron. Also, whereas effective catalysts can be made in which the iron is present entirely in the ferrous condition or entirely in the ferric condition, it is preferred to employ a solution containing a proportion of ferric to ferrous iron in the ratio of about 4 gram atoms of the former to about 1 gram atom of the latter. Suitable reducing agents are alkali metal formates, alkaline earth metal formates, aqueous solutions of formaldehyde and elemental hydrogen in aqueous medium, Sodium formate is a preferred reducing agent. The reducing agent is best employed in a slight excess over the theoretical amount required to reduce the palladous ions to palladium metal. In all cases, an alkaline material is added to the reaction mixture in such amount that the pHs of the aqueous solution containing the metal ions is greater than about 7 at all times during the reduction reaction and at its conclusion; if desired, the pH can be made greater than about 7 even before the reducing agent is added. Suitable alkaline materials are those selected from the class consisting of hydroxides and carbonates of ammonia, the alkali metals, magnesium, and the alkaline earth metals; such as aqua ammonia, lithium hydroxide, sodium carbonate, magnesium hydroxide and calcium carbonate. Preferably, the reducing agent and at least a portion of the alkaline material employed are combined to form a single alkaline reductant reagent. A preferred reducing agent can be made by treating an aqueous solution of formic acid with somewhat more than its neutralization equivalent of sodium carbonate, so that the finished solution of alkaline reductant comprises essentially sodium formate with a slight excess of sodium carbonate.

By the processes described above, there is obtained a class of catalysts containing, as essential catalytic components, spongy, reduced palladium metal (palladium sponge) deposited on a substrate of a mixture of zinc and iron hydroxides and/or zinc and iron carbonates and/or zinc and iron basic carbonates. The precise composition of the substrate obviously depends upon the particular metal salts contained in the starting solution and the particular alkaline materials employed. Inasmuch as substantially all of the palladium, zinc and iron content of the starting solution is precipitated (the palladium in the form of reduced metal, and the zinc and iron in the form of basic compounds) the catalyst contains these three metals in substantially the same proportions as in the starting material.

With the aid of the catalysts of the invention, prepared as described above, the racemization processes of the invention can be effected under a variety of conditions. Any lower alkanol, e.g. methanol, ethanol, isopropanol or n-butanol, can be employed as the medium for the racemization procedure; but it is preferred to use methanol. The racemization reaction can be effected at any temperature from about 45° C. to about 80° C.; but it is preferred to operate at about 65° C. The pH of the racemization medium can vary from about 6.0 to about 10.5; but it is preferred to operate at about pH 8.0. The weight ratio between the organic base material (octahydroisoquinoline derivative) subjected to racemization and the racemization catalyst can vary from about 5 base:1 catalyst to about 25 base:1 catalyst. It is preferred to employ the base in a proportion about 12 to 13 times the weight of the catalyst.

A preferred procedure for preparing the catalyst comprises dissolving in water a water-soluble zinc salt, a water-soluble ferric salt, a water-soluble ferrous salt, and a water-soluble palladous salt, and adjusting the pH so as to precipitate a portion of the iron and zinc, preferably as hydroxides. It is preferred to effect the precipitation by adjusting to about pH 5.8–5.9 with one of the water-soluble alkaline materials above identified. To the aqueous system containing the palladium, zinc and iron is then added a reducing agent, taking care (if the reductant reagent does not itself contain sufficient excess alkaline material) to add to the system sufficient alkaline material that the pH of the reaction mixture is greater than about 7 before the reduction starts and remains greater than about 7 during and after the reduction step. It is preferred to warm the reaction mixture, preferably above about 60° C. The reducing agent is allowed to act until no further reduction takes place (i.e. until all of the palladium has been precipitated, as evidenced by decolorization of the supernatant liquid), and the precipitated catalyst is then filtered off and freed of most of its adhering water by washing the filter cake with methanol. Care must be taken to avoid letting the catalyst cake dry out completely, inasmuch as the dry catalyst is rather pyrophoric.

A preferred form of catalyst is prepared by dissolving in water a water-soluble zinc salt, a water-soluble ferric salt, a water-soluble ferrous salt and a water-soluble palladous salt, so that the resulting solution contains the metals in a gram atomic proportion of about 20 Pd:5 Zn:4 $Fe^{+++}$:1 $Fe^{++}$; adding sufficient dilute aqueous sodium hydroxide solution to adjust the pH to 5.8–5.9, thereby precipitating a portion of the zinc and iron; and adding to this aqueous system an aqueous solution containing a slight excess (over the theoretical amount required to reduce the palladous salt) of sodium formate, and a little free sodium carbonate. The catalyst so prepared has been found particularly efficacious in a preferred embodiment of the invention described in the next paragraph.

A preferred embodiment of the racemization aspect of the invention comprises heating 1-(p-methoxybenzyl)-2-methyl-1,2,3,4,5,6,7,8 - octahydroisoquinoline having levo rotation in methanol, dissolved in a liquid medium comprising essentially methanol and having a pH of about 8.0, at a temperature of about 65° C., in the presence of the catalyst prepared according to the preceding paragraph; the weight proportion of the organic base starting material to the catalyst being about 12.5:1.

Inasmuch as the racemized materials produced by the process of the invention can be subjected to optical resolution, thereby separating the two enantiomorphic forms, it will be apparent that the invention provides an elegant method of converting one enantiomorphic form into the other. In particular, in a preferred embodiment, the invention provides a facile and economical method of converting 1 - (p - methoxybenzyl)-2-methyl - 1,2,3,4,5,6,7,8-octahydroisoquinoline having levo rotation in methanol into its enantiomorph which has dextro rotation in methanol. The latter is an intermediate in the synthesis of the important antitussive material dextromethorphan. It will be apparent that the processes of the invention have particular utility in the synthesis of pharmaceuticals, especially dextromethorphan.

The invention is further illustrated by the following examples, which are illustrative but not limitative thereof.

*Example 1*

In 1000 ml. of distilled water were dissolved 5.0 g. of ferric chloride hexahydrate, 1.0 g. of ferrous chloride tetrahydrate and 3.0 g. of zinc chloride. To the solution was added 50 ml. of an aqueous palladous chloride solution containing 200 g. of Pd metal per liter. To the resulting solution was added 2N aqueous sodium hydroxide solution until a pH of 5.8 was reached (about 200 ml. of alkaline solution required); a portion of the zinc and iron was thereby precipitated as the respective hydroxides. The resulting mixture was heated rapidly to about 85° C., while stirring well, and then 160 ml. of an alkaline sodium formate solution (containing in a liter of solution 93.5 g. of anhydrous sodium carbonate and 60 ml. of formic acid, containing 98% by weight HCOOH) was added within one minute, with continued stirring. There was considerable foaming, with violent evolution of carbon dioxide. The supernatant solution became colorless; the heating and stirring were immediately interrupted, and the mixture was allowed to cool quickly. When the temperature reached 60° C., the colorless supernatant liquid was decanted. The remaining material was transferred to a suction funnel and the mother liquor was removed, taking care not to let the catalyst cake dry out completely. The cake was not washed with water; instead, 1000 ml. of methanol was poured through the cake onto the filter. The catalyst was immediately removed from the filter and the minimum quantity of methanol necessary to cover it was added; the catalyst was left thus until ready for use.

*Example 2*

150 g. of 1-(p-methoxybenzyl)-2-methyl-1,2,3,4,5,6,7,8-octahydroisoquinoline oxalate, $[\alpha]_D^{20}=-38.5°$ ($c=1$ in methanol), was suspended in 1200 ml. of water. 300 ml. of methylene chloride and 115 ml. of concentrated ammonium hydroxide (containing 29% by weight $NH_3$) were added. The methylene chloride phase, containing most of the liberated base, was separated from the aqueous phase. The latter was extracted with 100 ml. of methylene chloride and the extract was added to the previously separated organic phase. The combined methylene chloride solutions were washed until neutral to phenolphthalein, then the solvent was distilled off; leaving as a liquid residue the free base, 1-(p-methoxybenzyl)-2-methyl-1,2,3,4,5,6,7,8-octahydroisoquinoline.

The previously prepared amount of catalyst in methanol (from Example 1) was added to the 1-(p-methoxybenzyl) - 2 - methyl-1,2,3,4,5,6,7,8-octahydroisoquinoline base as obtained above, and the volume was adjusted with methanol to a total of 500 ml. The initial rotation was $[\alpha]_D^{20}=-75°$ ($c=1$ in methanol), indicating a content of about 99% of the isomer having levo rotation in methanol. A few drops of glacial acetic acid were added until the pH was 8.0. The reaction mixture was heated, with thorough stirring, until it refluxed gently (internal temperature 65° C.). The refluxing, with continued stirring, was maintained for a period of 8 hours. Small samples of the mixture were withdrawn periodically in order to follow the progress of the racemization. At the end of the 8 hour reaction period the rotation was $[\alpha]_D^{20}=-14.0°$ ($c=1$ in methanol). At the end of this time the reaction mixture was allowed to cool slowly overnight with constant agitation. Then the catalyst was filtered off and washed with 100 ml. of methanol, the washings being added to the filtrate. The methanol was removed from the combined methanolic liquors by vacuum distillation. The residue was dissolved in 150 ml. of acetone and a solution of 35.0 g. of anhydrous oxalic acid in 150 ml. of acetone was added, while agitating and cooling. The mass was cooled to 0° C. The precipitated material was filtered off, washed with 100 ml. of cold acetone, and then dried to constant weight at 70° C. There was thus obtained 101.0 g. of 1-(p-methoxybenzyl)-2-methyl-1,2,3,4,5,6,7,8-octahydroisoquinoline oxalate, having $$[\alpha]_D^{20}=-3.0° \ (c=1 \text{ in methanol})$$

containing approximately 47% of the osomer having dextro rotation in methanol, and approximately 53% of the isomer having levo rotation in methanol.

For convenience of reference, it may be noted that (1-

(p-methoxybenzyl)-2-methyl-1,2,3,4,5,6,7,8-octahydroisoquinoline oxalate employed as starting material in this example is a known compound, disclosed by Schnider, Brossi and Vogler, Helvetica Chimica Acta 37, 710 (1954) at page 717.

*Example 3*

The procedure of Example 1 was repeated, in order to prepare an additional sample of the catalyst preparation therein described.

100 g. of 1-(p-hydroxybenzyl)-1,2,3,4,5,6,7,8-octahydoisoquinoline, $[\alpha]_D^{20}=+159.3°$ ($c=1$ in methanol) was placed in 300 ml. of methanol and the mixture was heated to 60° C., with stirring, in order to effect solution of the organic base. To the solution was added the catalyst prepared as described in the preceding paragraph, and then sufficient methanol was added to make the total volume 600 ml. The mixture was heated to reflux (internal temperature 66° C.), and was refluxed, while stirring, for 8 hours. At the end of this time the reaction mixture was allowed to cool slowly overnight, while continuing the stirring. Then the catalyst was filtered off and washed with 100 ml. of methanol, the washings being added to the filtrate. The methanol was removed from the combined methanolic liquors by vacuum distillation. The solid residue, comprising essentially a mixture of the isomeric forms of 1-(p-hydroxybenzyl) - 1,2,3,4,5,6,7,8 - octahydroisoquinoline, had $[\alpha]_D^{20}=+153.7°$ ($c=1$ in methanol).

For convenience of reference, it may be noted that the free base, 1-(p-hydroxybenzyl)-1,2,3,4,5,6,7,8-octahydroisoquinoline, employed as starting material in this example, can be made by the following procedure (which is not a part of the instant invention):

232 g. of p-benzyloxy-phenylacetic acid are suspended in 4000 g. of xylene and to this suspension is added, while cooling, 125 g. of β-cyclohexenyl-ethylamine. The reaction mixture is refluxed, the water formed during the condensation being continuously removed by means of a water separator. After 18 ml. of water have been separated, the solvent is removed in vacuo and the residue is crystallized from isopropanol. The β-cyclohexenylethylamide of p-benzyloxy-phenylacetic acid, M.P. 108° C., thus obtained, is heated at 80° C. for 2 hours with 184 g. of phosphorus oxychloride in 1400 ml. of absolute benzene. The reaction mixture is cooled, and the benzene solution is shaken with ice water for 2 hours. The aqueous phase is separated and cautiously made alkaline to phenolphthalein with concentrated aqueous sodium hydroxide solution, while cooling with ice. The precipitated base is taken up in diethyl ether, washed neutral with water, dried over sodium sulphate and the ether is removed. The residue is then dissolved in 6 times its weight of methanol and hydrogenated in the presence of 150 g. of Raney nickel. After absorption of an amount of hydrogen corresponding to 1 mol, the hydrogenation comes to an end. The methanolic solution of 1 -(p-benzyloxybenzyl)-1,2,3,4,5,6,7,8-octahydroisoquinoline obtained is separated from the Raney nickel catalyst by suction filtration, 5% palladium-charcoal is added and the hydrogenation is resumed, a further mol of hydrogen being taken up. The hydrogenation product, which smells of toluene, is then separated from the catalyst, methanol and toluene. It is a light yellow colored, viscous oil which crystallizes upon rubbing with acetone. The 1 - (p - hydroxybenzyl)-1,2,3,4,5,6,7,8-octahydroisoquinoline obtained melts at 152°–154° C.

243 g. of 1-(p-hydroxybenzyl)-1,2,3,4,5,6,7,8-octahydroisoquinoline are dissolved in 1950 ml. of methanol and cooled to 0° C. To this solution is added an ice cold solution of 150 g. of D-tartaric acid in 1200 ml. of methanol and the mixture is allowed to stand at 0° C. for 72 hours. The dextrorotatory 1-(p-hydroxybenzyl)-1,2,3,4,5,6,7,8 - octahydroisoquinoline - D-tartrate which crystallizes is separated from the methanolic solution as completely as possible and washed with cold methanol. Upon concentrating the filtrate in vacuo to approximately 1500 ml., inoculating with the (+)-D-tartrate just obtained and allowing to stand at 0° C., the remainder of the (+)-D-tartrate crystallizes.

When crystallized from absolute alcohol, the 1-(p-hydroxybenzyl) - 1,2,3,4,5,6,7,8 - octahydroisoquinoline - D-tartrate forms colorless, fine needles, which are soluble in water and methanol and melt at 200° C. $[\alpha]_D^{21°}=+104°$ ($\pm 2°$) ($c=1$ in methanol). By addition of aqueous ammonia to an aqueous solution of the tartrate, the (+)-1-(p-hydroxybenzyl)-1,2,3,4,5,6,7,8-octahydroisoquinoline is obtained which, when crystallized from acetone, melts at 162°–164° C.

*Example 4*

In 1000 ml. of distilled water were dissolved 5.0 g. of ferric chloride hexahydrate, 1.0 g. of ferrous chloride tetrahydrate and 3.0 g. of zinc chloride. To this solution was added 50 ml. of an aqueous palladous chloride solution containing 200 g. of Pd metal per liter. The resulting solution was adjusted to pH 6.05 by adding 2N aqueous sodium hydroxide solution (200 ml. was required). The resulting suspension was heated to 85° C., while stirring, and to the stirred, heated solution was added over a period of one minute an alkaline formaldehyde solution made from 140 ml. of 2N aqueous sodium hydroxide solution and 21 g. of aqueous formaldehyde solution containing 37% by weight HCHO. The heating and stirring were immediately interrupted, and the mixture was allowed to cool quickly. When the temperature reached 60° C. the colorless supernatant liquid was decanted and the remaining material was transferred to a suction funnel. The mother liquor was sucked off and 1000 ml. of methanol was poured through the wet filter cake in order to remove most of the water therefrom. Then the catalyst cake was immediately removed from the filter and suspended in the minimum quantity of methanol necessary to cover it.

*Example 5*

150 g. of 1-(p-methoxybenzyl)-2-methyl-1,2,3,4,5,6,7,8-octahydroisoquinoline oxalate, $[\alpha]_D^{20}=-41.4°$ ($c=1$ in methanol), was converted to the free base in the same manner described in Example 2 above. To the free base so obtained was added the suspension in methanol of catalyst, prepared as described in Example 4 above. Then additional methanol was added, to a total volume of 400 ml. The reaction mixture was stirred and heated to reflux (internal temperature 65° C.) and maintained at this temperature for 8 hours, while stirring. Then the mixture was allowed to cool slowly overnight, while stirring continuously. The catalyst and the methanol were removed in the manner described in Example 2 above, and the residual free base was converted to its oxalate in the manner described in Example 2 above. There was thus obtained 1-(p-methoxybenzyl)-2-methyl-1,2,3,4,5,6,7,8 - octahydroisoquinoline oxalate having $[\alpha]_D^{20}=-29.6°$ ($c=1$ in methanol).

*Example 6*

5.0 g. of ferric chloride hexahydrate, 1.0 g. of ferrous chloride tetrahydrate and 3.0 g. of zinc chloride was dissolved in 1000 ml. of water. To the solution was added 50 ml. of an aqueous palladous chloride solution containing 200 g. of Pd metal per liter. The solution was adjusted to a pH of 6.05 by addition of 2N aqueous sodium hydroxide solution (210 ml. required). Then the reaction mixture was heated to 85° C. and, while stirring, 160 ml. of an alkaline calcium formate reductant (made from 14 g. of calcium carbonate and 9.6 ml. of formic acid containing 98% by weight HCOOH) was added within one minute. Immediately thereafter, the heating and stirring were interrupted, and the reaction mixture was rapidly cooled. When the temperature reached 60° C., the colorless supernatant liquid was decanted and the residual suspension was transferred to a suction filter. The remaining liquid was filtered off, and 1000 ml. of methanol was poured through the filter cake in order to remove as much water as possible. The filter cake was then suspended in the minimum quantity of methanol required to cover it and kept until ready for use.

*Example 7*

150 g. of 1-(p-methoxybenzyl)-2-methyl-1,2,3,4,5,6,7,8-octahydroisoquinoline oxalate, $[\alpha]_D^{20} = -41.4°$ ($c=1$ in methanol) was converted to the free base in the manner described in Example 2 above. To the free base was added the catalyst suspended in methanol, as prepared in Example 6 above, and additional methanol was added to make up a total volume of 400 ml. The mixture was heated to reflux (internal temperature 65° C.) and maintained at this temperature, with stirring, for 8 hours. At the end of the heating period, the mixture was allowed to cool slowly overnight with agitation, the catalyst and methanol were separated, and the residual free base was converted to oxalate, all in the manner described in Example 2 above. The 1-(p-methoxybenzyl)-2-methyl-1,2,3,4,5,6,7,8-octahydroisoquinoline oxalate thus obtained had $[\alpha]_D^{20} = -24.5°$.

*Example 8*

3.0 g. of ferric chloride hexahydrate and 1.0 g. of zinc chloride were dissolved in 1000 ml. of water. 10 ml. of a palladous chloride solution (containing 200 g. of palladium metal per liter) was added, and then the pH of the solution was adjusted to 6.2 by addition of 2N aqueous sodium carbonate solution (200 ml. required). The reaction mixture was then heated to 90° C. and 160 ml. of a sodium formate solution (containing in a liter of solution 93.5 g. of anhydrous sodium carbonate and 60 ml. of 98% by weight formic acid) was added, while stirring. The heating and stirring were continued until all of the metals were precipitated, as evidenced by decolorization of the supernatant liquid, which occurred almost immediately. Then the reaction mixture was quickly cooled to 60° C., the supernatant liquid was decanted, and the remaining suspension was transferred to a suction filter to remove the last of the mother liquor. 1000 ml. of methanol was poured through the filter to remove as much water as possible. The filter cake was then suspended in the minimum quantity of methanol required to cover it and kept until ready for use.

*Example 9*

100 g. of 1-(p-methoxybenzyl)-2-methyl-1,2,3,4,5,6,7,8-octahydroisoquinoline oxalate $[\alpha]_D^{20} = -38.5$ ($c=1$ in methanol) was converted to the free base in the manner described in Example 2 above. The suspension of catalyst and methanol, as prepared in Example 8 above, was added to the free base and sufficient methanol was added to make a total volume of 500 ml. The solution was heated at the reflux temperature (internal temperature=64° C.) for 8 hours, while stirring continuously. Then the reaction mixture was allowed to cool overnight while stirring. The catalyst and methanol were removed in the manner described in Example 2, and the free base thus obtained was converted to oxalate in the manner described in Example 2. There was thus obtained 1-(p-methoxybenzyl) - 2 - methyl - 1,2,3,4,5,6,7,8 - octahydroisoquinoline oxalate having $[\alpha]_D^{20} = -23.5$ ($c=1$ in methanol).

*Example 10*

5.0 g. of ferric chloride hexahydrate, 1.0 g. of ferrous chloride tetrahydrate and 3.0 g. of zinc chloride were dissolved in 1000 ml. of water. 50 ml. of an aqueous palladous chloride solution containing 200 g. of Pd metal per liter, was added. The pH was adjusted to 7.5 by addition of 2N aqueous sodium hydroxide solution, and the solution was heated to 60° C. Then, while stirring, hydrogen gas was bubbled in, at a hydrogen pressure of 5 p.s.i. gauge, until all precipitation ceased and the supernatant solution became colorless. The supernatant liquor was decanted and the remaining suspension was transferred to a suction filter to remove the last of the mother liquor. Then 1000 ml. of methanol were poured through the filter cake. The filter cake was suspended in the minimum amount of methanol necessary to cover it, and kept until ready for use.

*Example 11*

In 1000 ml. of water were dissolved 3.7 g. of ferrous chloride tetrahydrate, 3.0 g. of zinc chloride and 50 ml. of an aqueous palladous chloride solution containing 200 g. of Pd metal per liter. The mixture was heated to 85° C. and 250 ml. of an aqueous sodium formate solution (containing in a liter 93.5 g. of anhydrous sodium carbonate and 60 ml. of 98% by weight formic acid) was added within one minute, while stirring. The metals were precipitated almost immediately, as indicated by decolorization of the supernatant liquid. The supernatant liquid was then decanted and the residual suspension was transferred to a suction filter. The last of the mother liquor was removed on the filter, then 1000 ml. of methanol was poured through the filter cake. The cake was immediately removed from the filter and suspended in the minimum quantity of methanol necessary to cover it, and the suspension was kept until the catalyst was required for use.

I claim:

1. A process of making a catalyst which comprises mixing an aqueous solution containing palladous ions, zinc ions and iron ions, in the proportion of from about 2 to about 9 gram atoms of Pd:about 1 gram atom of Zn:about 1 gram atom of Fe, with alkaline material selected from the group consisting of the hydroxides and carbonates of ammonia, of the alkali metals, of magnesium, and of the alkaline earth metals, until a pH of from about 5.8 to about 5.9 is reached; and then, at a pH greater than about 7, treating the mixture with a reducing agent selected from the group consisting of alkali metal formates, alkaline earth metal formates, aqueous solutions of formaldehyde and elemental hydrogen in aqueous medium, until substantially all of the palladium has been precipitated.

2. A catalyst comprising essentially palladium sponge deposited upon a mixture of (1) material selected from the group consisting of the hydroxides, carbonates and basic carbonates of zinc and (2) material selected from the group consisting of the hydroxides, carbonates and basic carbonates of iron; the gram-atomic proportion of palladium:zinc:iron being from about 2 to about 9 Pd:about 1 Zn:about 1 Fe.

3. A catalyst according to claim 2 wherein iron is present in both ferrous and ferric condition.

4. A process of making a catalyst which comprises subjecting an aqueous system containing palladous ions, zinc ions, ferric ions and ferrous ions, in the gram-atomic proportions of approximately 20 Pd:5 Zn:4 Fe$^{+++}$:1 Fe$^{++}$ the zinc and iron ions being partially precipitated as hydroxides, to the reducing action of an aqueous solution of sodium formate containing a slight excess of sodium carbonate.

5. A catalyst made by the process of claim 4.

References Cited in the file of this patent

UNITED STATES PATENTS 2,819,272    Hollander _____ Jan. 7, 1958